United States Patent
Lawrence Ashok Inigo

(10) Patent No.: US 8,509,483 B2
(45) Date of Patent: Aug. 13, 2013

(54) CONTEXT AWARE AUGMENTATION INTERACTIONS

(75) Inventor: Roy Lawrence Ashok Inigo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 216 days.

(21) Appl. No.: 13/018,180

(22) Filed: Jan. 31, 2011

(65) Prior Publication Data

US 2012/0195460 A1    Aug. 2, 2012

(51) Int. Cl.
*G06K 9/00* (2006.01)

(52) U.S. Cl.
USPC ......................................... 382/103

(58) Field of Classification Search
USPC ... 382/100–107; 348/169–171; 73/488–491; 356/27–30; 345/620–628
See application file for complete search history.

(56) References Cited

U.S. PATENT DOCUMENTS

| | | | |
|---|---|---|---|
| 6,891,518 B2 | 5/2005 | Sauer et al. | |
| 2003/0179218 A1 | 9/2003 | Martins et al. | |
| 2006/0273984 A1* | 12/2006 | Wanda et al. | 345/7 |
| 2006/0284792 A1* | 12/2006 | Foxlin | 345/8 |
| 2007/0024527 A1 | 2/2007 | Heikkinen et al. | |
| 2008/0242418 A1 | 10/2008 | Theimer et al. | |
| 2012/0088526 A1* | 4/2012 | Lindner | 455/457 |
| 2012/0120103 A1* | 5/2012 | Border et al. | 345/633 |

FOREIGN PATENT DOCUMENTS

| | | |
|---|---|---|
| GB | 2399248 A | 9/2004 |
| KR | 20090044700 A | 5/2009 |
| WO | 2004042662 A1 | 5/2004 |
| WO | 2005107274 A1 | 11/2005 |

OTHER PUBLICATIONS

Wei Zhu , Charles B. Owen , Hairong Li , Joo-hyun Lee, "Personaiized in-store e-commerce with the promopad: an augmented reality shopping assistant", Electronic Journal for E-commerce Tools and Applications. 19 pages (2004).
International Search Report and Written Opinion—PCT/US2012/023381—ISA/EPO—Sep. 12, 2012.
Lee, et al, "Component-based Approach to Immersive Authoring of Tangible Augmented Reality App" University of Canterbury, Uploaded on Sep. 14, 2009, https://www.youtube.com/watch?v=8kCxQMU0p_k.
Sinclair et al., "Augmented reality as an interface to adaptive hypermedia systems", New Review of Hypermedia and Multimedia, Taylor Graham, London, GB, Jan. 1, 2003, pp. 117-136, vol. 9, No. 1, XP008154576, UK, ISSN: 1361-4568, DOI: 10.1080/13614560410001725338 [retrieved on Mar. 4, 2011].

* cited by examiner

*Primary Examiner* — Atiba O Fitzpatrick

(57) ABSTRACT

A mobile platform renders different augmented reality objects based on the spatial relationship, such as the proximity and/or relative positions between real-world objects. The mobile platform detects and tracks a first object and a second object in one or more captured images. The mobile platform determines the spatial relationship of the objects, e.g., the proximity or distance between objects and/or the relative positions between objects. The proximity may be based on whether the objects appear in the same image or the distance between the objects. Based on the spatial relationship of the objects, the augmentation object to be rendered is determined, e.g., by searching a database. The selected augmentation object is rendered and displayed.

38 Claims, 4 Drawing Sheets

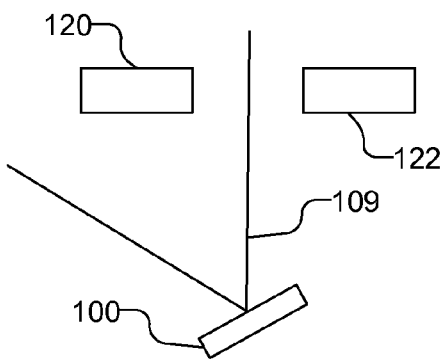
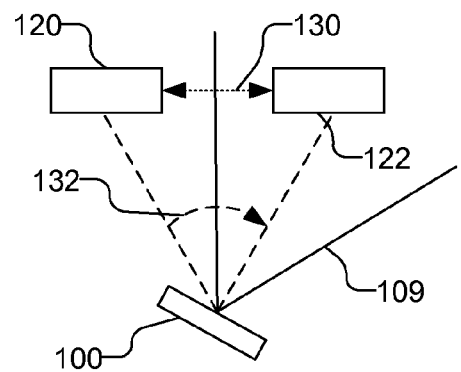
Fig. 5A
Fig. 5B
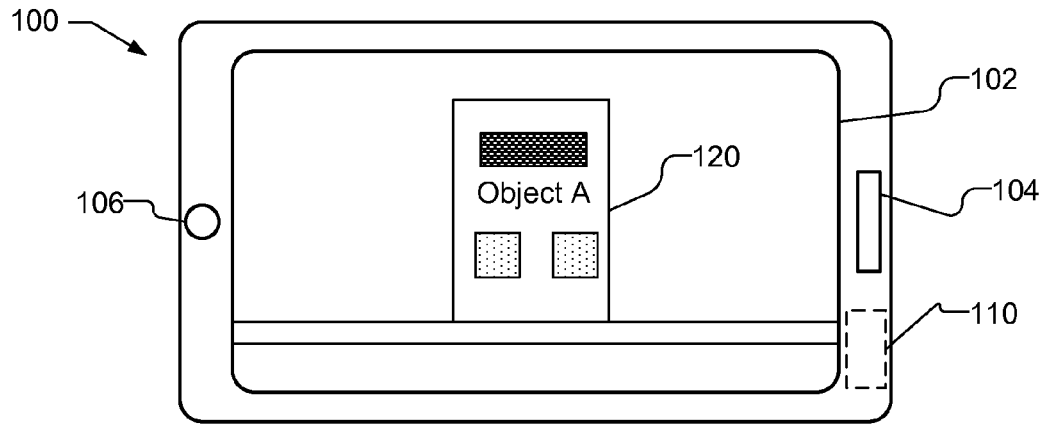
Fig. 6A
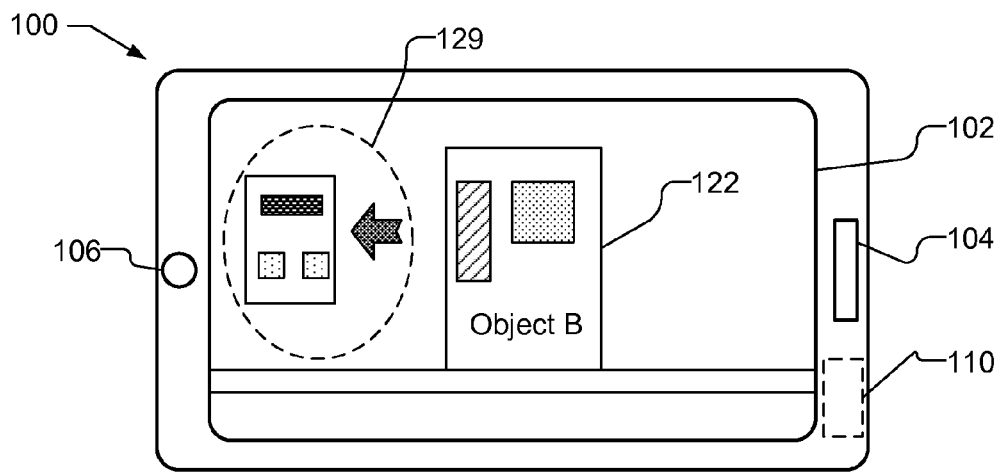
Fig. 6B

CONTEXT AWARE AUGMENTATION INTERACTIONS

BACKGROUND

In augmented reality (AR) applications, a real world object is imaged and displayed on a screen along with computer generated information, such as an image or textual information. AR can be used to provide information, either graphical or textual, about a real world object, such as a building or product. Typically, the AR object that is rendered is dependent on the real-world object that is imaged. However, the context of that real-world object, e.g., the location or other surrounding objects, is not considered when rendering an AR object. It is desirable, however, to be able to display AR content that has context to the physical surroundings or proximity to other products.

SUMMARY

A mobile platform renders different augmented reality objects based on the spatial relationship, such as the proximity and/or relative positions between real-world objects. The spatial relationship, which may be proximity of the objects or the relative positions of the objects, provides the context of the real-world objects. The mobile platform detects and tracks a first object and a second object in one or more captured images. The mobile platform then determines the spatial relationship of the objects as the proximity (or distance) and/or the relative positions between objects. The proximity may be based on whether the objects appear in the same image or a quantitative distance between the objects determined, e.g., based on pose information or through image processing. Based on the spatial relationship of the objects, the augmentation object to be rendered is determined, e.g., by searching a database. The selected augmentation object is rendered and displayed.

BRIEF DESCRIPTION OF THE DRAWING

FIGS. 5A and 5B illustrate top views of mobile platform 100 separately imaging real world objects.

FIGS. 6A and 6B illustrates the images that are displayed by mobile platform when separately imaging the objects of FIGS. 5A and 5B, respectively.

DETAILED DESCRIPTION

Figure 1A:
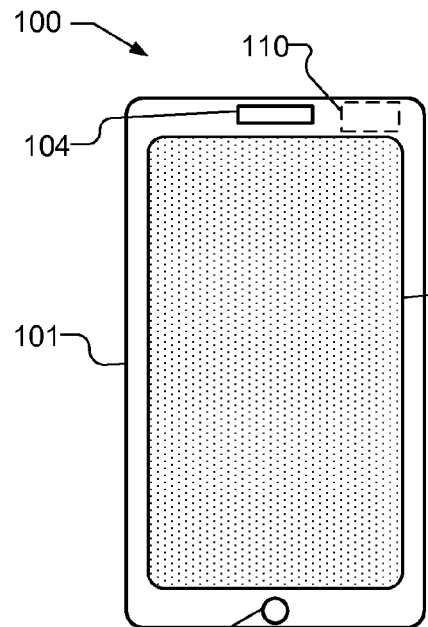
FIGS. 1A and 1B illustrate a front side and back side, respectively, of a mobile platform capable of providing augmented reality applications based on the spatial relationships of real-world objects.
Figure 1B:
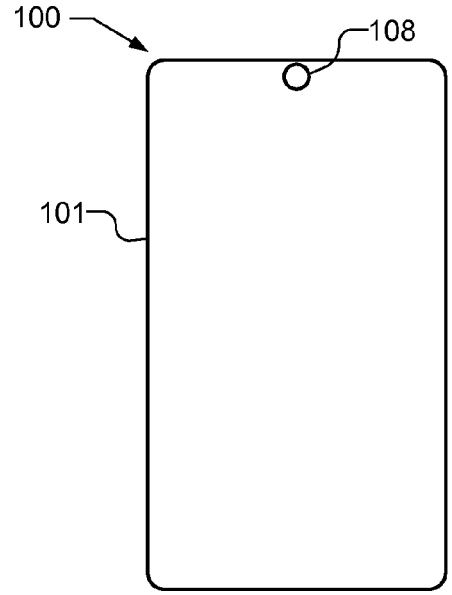

FIGS. 1A and 1B illustrate a front side and back side, respectively, of a mobile platform 100 capable of providing augmented reality applications based on the spatial relationships of real-world objects. The mobile platform 100 in FIGS. 1A and 1B is illustrated as including a housing 101, a display 102, which may be a touch screen display. The mobile platform 100 may also include a speaker 104 and microphone 106, e.g., if the mobile platform 100 is a cellular telephone. The mobile platform 100 further includes a forward facing camera 108 to image the environment, which is displayed on display 102. The mobile platform 100 may further include motion sensors 110, such as accelerometers, gyroscopes or the like, which may be used to assist in determining the pose of the mobile platform 100 or equivalently the camera 108, which may have a known/calibrated position relationship to the motion sensors 110. The pose of the mobile platform 100 may also or alternatively be determined using vision based tracking techniques. It should be understood that the mobile platform 100 may be any portable electronic device such as a cellular or other wireless communication device, personal communication system (PCS) device, personal navigation device (PND), Personal Information Manager (PIM), Personal Digital Assistant (PDA), laptop, camera, or other suitable mobile device that is capable of augmented reality (AR).

Figure 2:
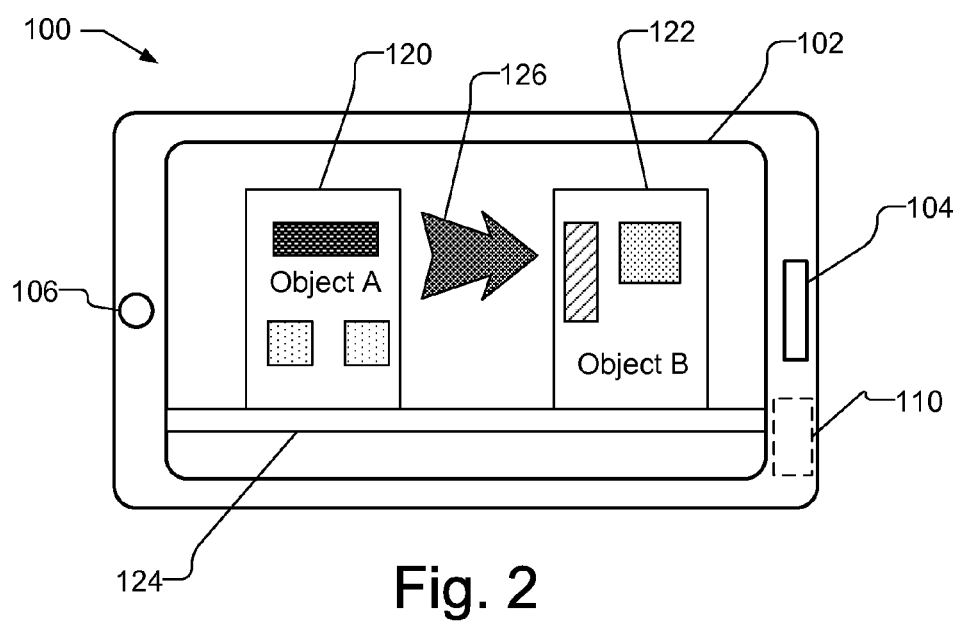
FIG. 2 illustrates a front side of the mobile platform displaying a captured image of two real world objects and an augmented object rendered based on the spatial relationship between the real world objects.

FIG. 2 illustrates a front side of the mobile platform 100 held in landscape mode. The display 102 is illustrated as displaying a captured image of two real world objects, object A 120 and object B 122. By way of example, object A 120 and object B 122 may be products, such as boxes of cereal that are near each other on a grocery shelf 124. The display 102 is also illustrated as displaying a computer rendered AR object 126, in the form of an arrow. The captured image of the real world objects 120, 122 is produced by camera 108, while the AR object 126 is a computer rendered objects (or information). It should be understood that the captured image may be a single image, e.g., photograph, or one or more frames of video produced by camera 108.

The AR object 126 rendered and displayed by mobile platform 100 is dependent on, not only on the real world objects that are imaged, but the spatial relationships of the imaged objects. By way of example, the spatial relationships may be the proximity of other imaged objects. Thus, one type of AR object may be rendered when a real world object is near another complementary real world object, while a different AR object or different behavior of the AR object may be rendered when the objects are not near or when an incompatible real world object is near. For example, one type of AR object may be rendered when breakfast products are placed near each other, while a different AR object or different behavior of the AR object may be rendered when a breakfast product is located near a liquor bottle. The spatial relationships of the real world object may include other factors such the relative positions of the objects as well as other factors, such as the time of day or geographic location.

Figure 3:
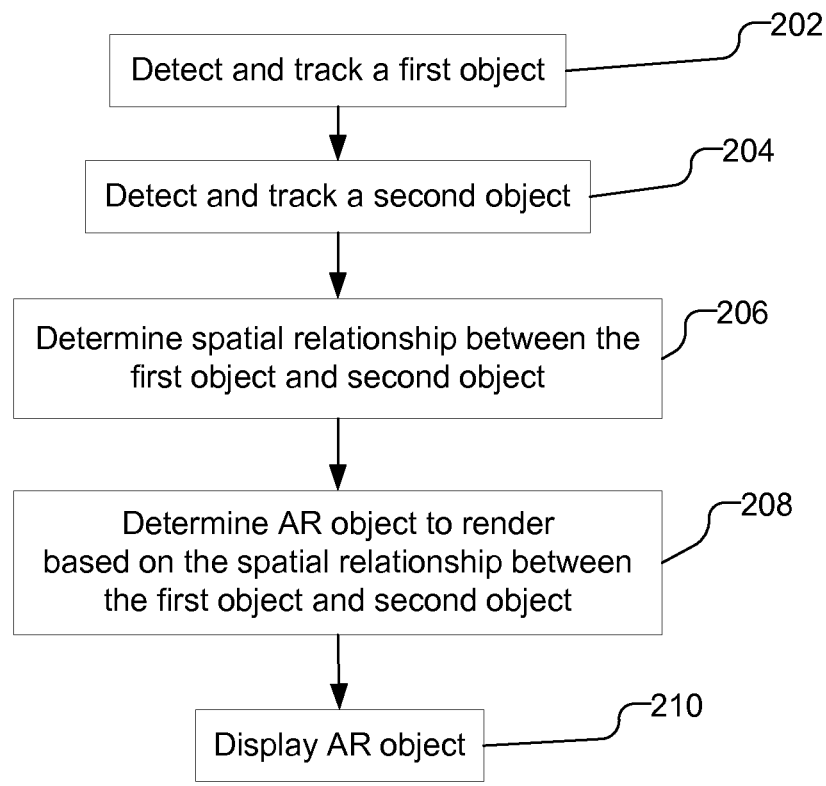
FIG. 3 is a flow chart of providing augmented reality applications based on the spatial relationships of real-world objects.

FIG. 3 is a flow chart of providing augmented reality applications based on the spatial relationships of real-world objects. As illustrated, a first object in an image captured by the camera of the mobile platform is detected and tracked (202). Once the object is detect it may be identified, e.g., by consulting an on-board database or by accessing a remote server. Tracking the object gives the mobile platform's position and orientation (pose) information relative to the object. The object may be a two-dimensional or three-dimensional object. By way of example, the object A 120 imaged by the mobile platform 100 in FIG. 2 is detected and tracked.

A second object in an image captured by the camera is also detected and tracked (204). Again, once detected, the second object may also be identified, e.g., by consulting an on-board database or by accessing a remote server. By way of example, the object B 122 imaged by the mobile platform 100 in FIG. 2 is detected and tracked. The second object may be an item that is located near and in the same frame of view, i.e., in the same captured image, as the first object. Additionally, the second object may be an item that is in a separate frame of view, i.e., the second object appears in a different captured image than the first object. Thus, for example, the first object may be imaged, detected and tracked. The mobile platform may then be moved to capture an image of the second object, which is detected and tracked.

The spatial relationship of the objects is then determined (206) to provide the context for the objects. If desired, the spatial relationship of the object may be determined only if the objects are identified as objects that have associated contextually dependent augmented reality objects, e.g., which may be determined by accessing an on-board or external database. The spatial relationships may be the proximity of the imaged objects. The first object and the second object may be considered to be proximate if at least portions of both objects are in the field of view of the camera at the same time. Alternatively, proximity may be determined as a quantitative distance between the first object and the second object. For example, the distance may be determined by comparing the distance between the objects to the size of the objects or using the pose information from tracking the first object and the second object. The distance may be compared to one or more thresholds to determine whether the objects are considered proximate. Additionally, if the first object and second object do not appear in the same image, the proximity of the objects may be determined based on the distance between the objects as determined using tracking information and data from the motion sensors 110 in the mobile platform 100. The spatial relationships may also or alternatively be the relative positions of the first object and the second object, e.g., whether the first object is in front of or above the second object. Additional contextual information may also be used, such as the presence (or absence) of one or more additional real world objects, the time of day, the ambient light, the geographic location of the mobile platform, etc.

Using the determined spatial relationships between the identified first object and the identified second object, the AR object to be rendered may be determined (208). For example, a database of AR objects may be maintained for different spatial relationships of specific real world objects. Once the spatial relationship of the real world objects is determined, the database may be accessed to determine the AR object to be rendered. The AR object may then be rendered and displayed by the mobile platform 100 (210).

Figure 4:
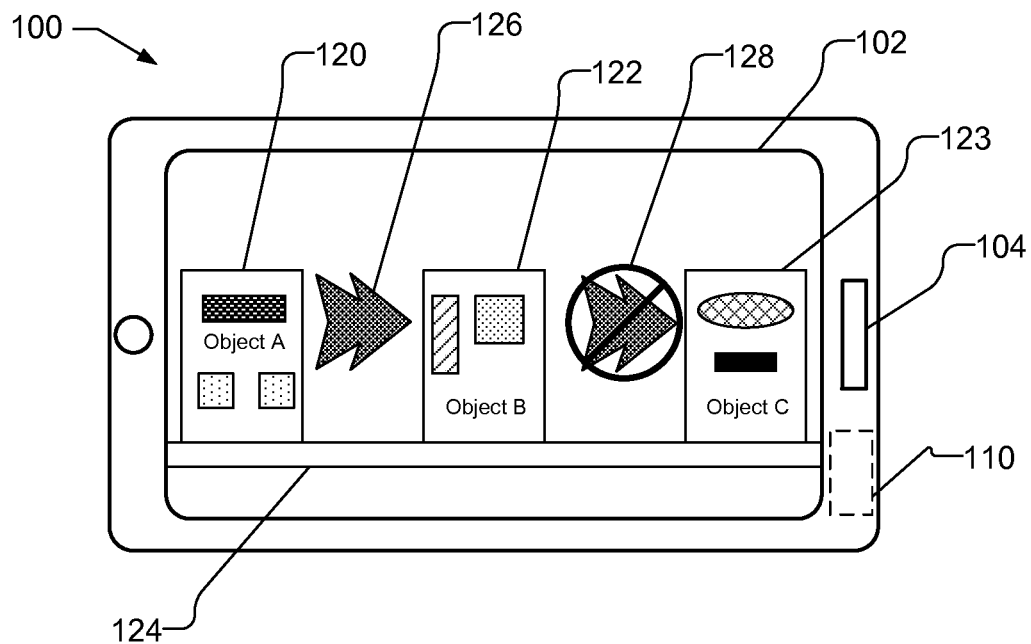
FIG. 4 illustrates a front side of the mobile platform displaying a captured image of three real world objects and different augmented objects rendered based on the spatial relationships between the real world objects.

By way of illustration, FIG. 2 shows an AR object 126 that is rendered and displayed based on the spatial relationship of identified object A 120 and identified object B 122. The AR object 126 is in the form of an arrow to indicate e.g., that object A 120 is compatible with object B 122. FIG. 4, on the other hand, illustrates mobile platform 100 producing an image similar to that shown in FIG. 2, except a third object is identified, object C 123, is detected and tracked and determined to be proximate to object B 122. A different AR object 128, which includes an arrow with a line through it, is rendered based on the spatial relationship, e.g., proximity, of object B 122 and incompatible object C 123. If desired, the AR object may be animated and the behavior of the animated AR object may change based on the spatial relationship of the real-world objects. Additionally, if desired, additional real-world objects may be detected and tracked and used to determine the AR object to be rendered.

FIGS. 5A and 5B illustrate top views of mobile platform 100 separately imaging object A 120 and object B 122, respectively. FIGS. 6A and 6B illustrates the images that are displayed on display 102 of mobile platform 100 when mobile platform 100 separately images object A 120 and object B 122, as illustrated in FIGS. 5A and 5B, respectively. As illustrated in FIGS. 5A and 6A, the mobile platform 100 images and displays real world object A 120. As discussed above in step 202 of FIG. 3, the object A 120 is detected and tracked. Object 122 is not displayed in FIG. 6A because object 122 is outside camera's field of view 109 in FIG. 5A. After moving the mobile platform 100 to place the real world object B 122 in the field of view 109, as illustrated in FIG. 5B, the object B 122 is imaged and displayed as shown in FIG. 6B. As discussed above in step 204 of FIG. 3, the object B 122 is detected and tracked. As illustrated in FIG. 5B, the spatial relationship of object A 120 and object B 122 is determined by determining the proximity of the objects (step 206 in FIG. 3). For example, the proximity may be determined as the distance between the object A 120 and object B 122, as illustrated by dashed arrows 130 and/or by the angular displacement between objects 120 and 122, illustrated by the dashed arrow 132. The distance 130 and/or angular displacement 132 may be determined using tracking information as well as data from the motion sensors 110 on the mobile platform. The desired AR object is deterred based on the determined spatial relationship, i.e., the proximity of the objects, (step 208 in FIG. 3), and then rendered and displayed (step 210 in FIG. 3). For example, as illustrated in FIG. 6B, an AR object 129 including a rendered image of the object A 120 and an arrow pointing in the direction of the object A 120 is displayed.

Figure 7:
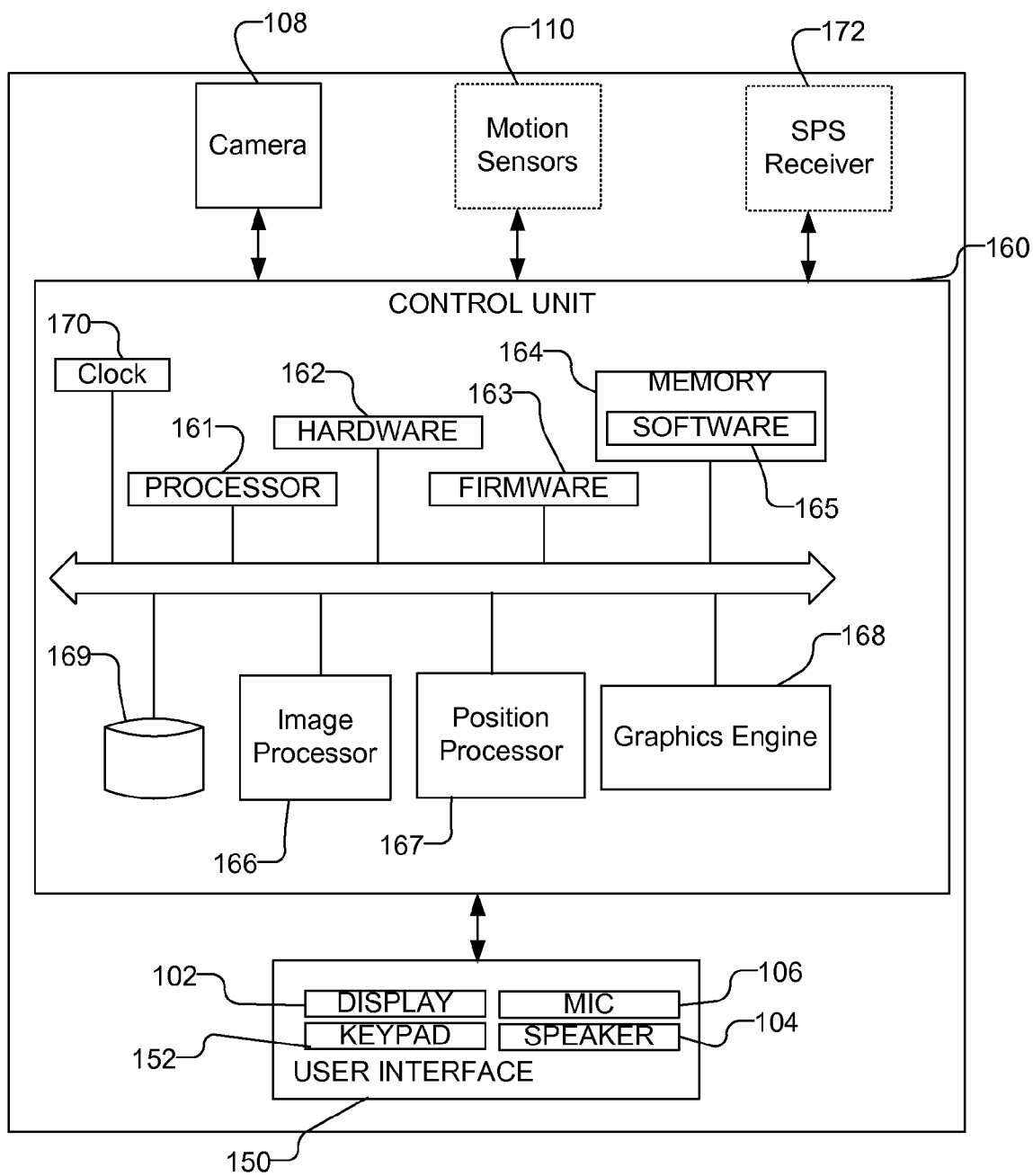
FIG. 7 is a block diagram of a mobile platform capable providing augmented reality applications based on the spatial relationship of real-world objects.

FIG. 7 is a block diagram of a mobile platform 100 capable of providing augmented reality applications based on the spatial relationship of real-world objects. The mobile platform 100 includes a means for capturing images of real world objects, such as camera 108, and motion sensors 110, such as accelerometers, gyroscopes, electronic compass, or other similar motion sensing elements. Mobile platform 100 may include other position determination methods such as object recognition using "computer vision" techniques. The mobile platform further includes a user interface 150 that includes a means for displaying captured images and rendered AR objects, such as the display 102. The user interface 150 may also include a keypad 152 or other input device through which the user can input information into the mobile platform 100. If desired, the keypad 152 may be obviated by integrating a virtual keypad into the display 102 with a touch sensor. The user interface 150 may also include a microphone 106 and speaker 104, e.g., if the mobile platform is a cellular telephone. Of course, mobile platform 100 may include other elements unrelated to the present disclosure, such as a wireless transceiver.

The mobile platform 100 also includes a control unit 160 that is connected to and communicates with the camera 108, motion sensors 110 and user interface 150. The control unit 160 accepts and processes data from the camera 108 and motion sensors 110 and controls the display 102 in response. The control unit 160 may be provided by a processor 161 and associated memory 164, hardware 162, software 165, and firmware 163. The control unit 160 may include an image processor 166 for processing the images from the camera 108 to detect real world objects. The control unit may also include a position processor 167 to determine and track the pose of the mobile platform 100 with respect to the real world objects e.g., based on data received form the motion sensors 110 and/or based on vision based tracking techniques using additional images captured by the camera 108. The position processor 167 may also determine the proximity of real world objects, as well as the spatial relations of the objects. The control unit 160 may further include a graphics engine 168, which may be, e.g., a gaming engine, to render desired AR objects with respect to the location and spatial relationship of the real world objects. The graphics engine 168 may retrieve AR objects from a database 169, which may be in memory 164, based on the spatial relationship of the real world objects, such as the proximity and/or relative positions of the objects, as well as any other desired factors, such as time of day (which may be determined based on clock 170), and geographic location (which may be determined based on data from an optional satellite position system (SPS) receiver 172). The image processor 166, position processor 167 and graphics engine are illustrated separately from processor 161 for clarity, but may be part of the processor 161 or implemented in the processor based on instructions in the software 165 which is run in the processor 161. It will be understood as used herein that the processor 161 can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile platform, and is not to be limited to any particular type of memory or number of memories, or type of media upon which memory is stored.

The device includes means for means for detecting and tracking the first object and the second object in one or more images, which may include the image processor 166, position processor 167, as well as the motion sensors 110 if desired. The device further includes a means for means for determining a spatial relationship between the first object and the second object, which may include the position processor 167. A means for determining an augmentation object to render based on the spatial relationship between the first object and the second object may include the graphics engine 168, which accesses a database 169. Additionally, the device may include a means for determining a pose (position and orientation of the mobile platform) associated with the different objects, which may include the position processor 167 as well as motion sensors 110. The device may include a means for comparing the size of the objects to the space between the objects to determine the distance between the objects, which may be the image processor 166.

The methodologies described herein may be implemented by various means depending upon the application. For example, these methodologies may be implemented in hardware 162, firmware 163, software 165, or any combination thereof For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 164 and executed by the processor 161. Memory may be implemented within or external to the processor 161.

If implemented in firmware and/or software, the functions may be stored as one or more instructions or code on a computer-readable medium. Examples include non-transitory computer-readable media encoded with a data structure and computer-readable media encoded with a computer program. For example, the computer-readable medium including program code stored thereon may include program code to display on the display an image of a first object and a second object, program code to detect and track the first object and to detect and track the second object, program code to determine a spatial relationship between the first object and the second object, program code to determine an augmentation object to render based on the spatial relationship between the first object and the second object, and program code to display on the display the augmentation object. The computer-readable medium may further include program code to determine a first pose with respect to the first object and a second pose with respect to the second object, wherein the program code to determine the distance between the first object and the second object uses the first pose and the second pose to determine the distance. The computer-readable medium may further include program code to compare the size of at least one of the first object and the second object to a space between the first object and the second object to determine the distance between the first object and the second object. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

For example, the computer-readable medium including program code stored thereon may include program code to display an image captured by a camera of a 2D surface with a 3D object, program code to detect and track the 2D surface in the image, program code to detect an occlusion of a region assigned as an area of interest on the 2D surface, program code to determine a shape of the 3D object, and program code to render and display a graphical object with reference to a location of the area of interest on the 2D surface, wherein the graphical object is rendered with respect to the shape of the 3D object.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method comprising:
   capturing and displaying an image of a first object and a second object;
   detecting and tracking the first object;
   detecting and tracking the second object;

identifying the first object and the second object;
accessing a database based on the identification of the first object and the second object to determine that the first object and the second object have associated contextually dependent augmented reality objects;
determining a spatial relationship between the first object and the second object in response to a determination that the first object and the second object have associated contextually dependent augmented reality objects;
determining an augmentation object to render based on the spatial relationship between the first object and the second object; and
displaying the augmentation object.

2. The method of claim 1, wherein the spatial relationship between the first object and the second object is based on proximity of the first object and second object.

3. The method of claim 2, wherein the proximity of the first object and the second object is based on at least portions of the first object and the second object being in the image together.

4. The method of claim 2, wherein the proximity of the first object and the second object is based on a distance between the first object and the second object.

5. The method of claim 4, wherein the proximity of the first object and the second object is determined by comparing the distance to a threshold.

6. The method of claim 4, further comprising determining a first pose with respect to the first object and a second pose with respect to the second object and using the first pose and the second pose to determine the distance.

7. The method of claim 4, further comprising comparing a size of at least one of the first object and the second object to a space between the first object and the second object to determine the distance.

8. The method of claim 1, wherein the spatial relationship between the first object and the second object is based on relative positions of the first object and second object.

9. The method of claim 1, wherein capturing and displaying the image of the first object and the second object comprises capturing and displaying a first image of the first object and capturing and displaying a second image of the second object, wherein the first object and the second object do not appear in a field of view of a camera together.

10. The method of claim 1, further comprising:
capturing and displaying an image of a third object;
detecting and tracking the third object;
determining a spatial relationship between the first object and the third object;
determining a different augmentation object to render based on the spatial relationship of the first object and the third object; and
displaying the different augmentation object.

11. A mobile platform comprising:
a camera;
a processor connected to the camera;
memory connected to the processor;
a display connected to the memory; and
software held in the memory and run in the processor to cause the processor to display on the display an image captured by the camera of a first object and a second object, detect and track the first object, detect and track the second object, identify the first object and the second object, access a database based on the identification of the first object and the second object to determine that the first object and the second object have associated contextually dependent augmented reality objects, determine a spatial relationship between the first object and the second object in response to a determination that the first object and the second object have associated contextually dependent augmented reality objects, determine an augmentation object to render based on the spatial relationship between the first object and the second object, and display on the display the augmentation object.

12. The mobile platform of claim 11, wherein the spatial relationship between the first object and the second object is based on proximity of the first object and second object.

13. The mobile platform of claim 12, wherein the proximity of the first object and the second object is based on at least portions of the first object and the second object being in a field of view of the camera together.

14. The mobile platform of claim 12, wherein the software that is run in the processor causes the processor to determine a distance between the first object and the second object to determine the proximity of the first object and the second object.

15. The mobile platform of claim 14, wherein the software that is run in the processor causes the processor to compare the distance to a threshold to determine the proximity of the first object and the second object.

16. The mobile platform of claim 14, wherein the software that is run in the processor causes the processor to determine a first pose with respect to the first object and a second pose with respect to the second object and to use the first pose and the second pose to determine the distance between the first object and the second object.

17. The mobile platform of claim 14, wherein the software that is run in the processor causes the processor to compare a size of at least one of the first object and the second object to a space between the first object and the second object to determine the distance between the first object and the second object.

18. The mobile platform of claim 11, wherein the spatial relationship between the first object and the second object is based on relative positions of the first object and second object.

19. The mobile platform of claim 11, wherein the software that is run in the processor causes the processor to display on the display a first image of the first object and to display on the display a second image of the second object, wherein the first object and the second object do not appear in a field of view of the camera together.

20. The mobile platform of claim 11, wherein the software that is run in the processor causes the processor to display on the display the image of a third object, detect and track the third object, determine a spatial relationship between the first object and the third object, determine a different augmentation object to render based on the spatial relationship between the first object and the third object, and display on the display the different augmentation object.

21. The mobile platform of claim 11, further comprising motion sensors, wherein the software that is run in the processor causes the processor to detect and track the first object and detect and track the second object using data from the motion sensors.

22. The mobile platform of claim 11, wherein the software that is run in the processor causes the processor to detect and track the first object and detect and track the second object using images captured by the camera.

23. A device comprising:
means for capturing an image of a first object and a second object;
means for detecting and tracking the first object and the second object;
means for identifying the first object and the second object;

means for accessing a database based on the identification of the first object and the second object to determine that the first object and the second object have associated contextually dependent augmented reality objects;

means for determining a spatial relationship between the first object and the second object in response to a determination that the first object and the second object have associated contextually dependent augmented reality objects;

means for determining an augmentation object to render based on the spatial relationship between the first object and the second object; and means for displaying the augmentation object and the image of the first object and the second object.

24. The device of claim 23, wherein the spatial relationship between the first object and the second object is based on proximity of the first object and second object.

25. The device of claim 24, wherein the proximity of the first object and the second object is based on at least portions of the first object and the second object being in the image together.

26. The device of claim 24, wherein the proximity of the first object and the second object is based on a distance between the first object and the second object.

27. The device of claim 26, wherein the means for determining the spatial relationship between of the first object and the second object compares the distance to a threshold.

28. The device of claim 26, further comprising means for determining a first pose with respect to the first object and a second pose with respect to the second object, wherein the first pose and the second pose are used to determine the distance.

29. The device of claim 26, further comprising means for comparing a size of at least one of the first object and the second object to a space between the first object and the second object to determine the distance.

30. The device of claim 23, wherein the spatial relationship between the first object and the second object is based on relative positions of the first object and second object.

31. A non-transitory computer-readable medium including program code stored thereon, comprising:

program code to display on the display an image of a first object and a second object;

program code to detect and track the first object and to detect and track the second object;

program code to identify the first object and the second object;

program code to access a database based on the identification of the first object and the second object to determine that the first object and the second object have associated contextually dependent augmented reality objects;

program code to determine a spatial relationship between the first object and the second object in response to a determination that the first object and the second object have associated contextually dependent augmented reality objects;

program code to determine an augmentation object to render based on the spatial relationship between the first object and the second object; and program code to display on the display the augmentation object.

32. The non-transitory computer-readable medium of claim 31, wherein the spatial relationship between the first object and the second object is based on proximity of the first object and second object.

33. The non-transitory computer-readable medium of claim 32, wherein the proximity of the first object and the second object is based on at least portions of the first object and the second object being in the image together.

34. The non-transitory computer-readable medium of claim 32, wherein the program code to determine the proximity of the first object and the second object comprises program code to determine a distance between the first object and the second object.

35. The non-transitory The computer-readable medium of claim 34, wherein the program code to determine the proximity of the first object and the second object compares the distance to a threshold to determine the proximity of the first object and the second object.

36. The non-transitory The computer-readable medium of claim 34, further comprising program code to determine a first pose with respect to the first object and a second pose with respect to the second object, wherein the program code to determine the distance between the first object and the second object uses the first pose and the second pose to determine the distance.

37. The non-transitory computer-readable medium of claim 34, wherein the program code to determine the distance between the first object and the second object compares a size of at least one of the first object and the second object to a space between the first object and the second object to determine the distance between the first object and the second object.

38. The non-transitory computer-readable medium of claim 31, wherein the spatial relationship between the first object and the second object is based on relative positions of the first object and second object.

* * * * *